United States Patent
Lee et al.

(10) Patent No.: US 7,232,191 B2
(45) Date of Patent: Jun. 19, 2007

(54) APPARATUS AND METHOD FOR CONTROLLING VEHICLE STABILITY

(75) Inventors: Kyo Il Lee, Seoul (KR); Young Man Cho, Seoul (KR); Jin-Oh Hahn, Seoul (KR); Seung Han You, Seoul (KR); Seung Jin Yoo, Incheon (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 0 days.

(21) Appl. No.: 11/305,767

(22) Filed: Dec. 15, 2005

(65) Prior Publication Data

US 2006/0131955 A1  Jun. 22, 2006

(30) Foreign Application Priority Data

Dec. 16, 2004 (KR) ............... 10-2004-0107312

(51) Int. Cl.
    *B60T 8/36* (2006.01)
(52) U.S. Cl. ..................... 303/140; 303/146
(58) Field of Classification Search ........... 701/70–72, 701/78, 90, 96; 303/139, 140, 146, 155
    See application file for complete search history.

(56) References Cited

U.S. PATENT DOCUMENTS

| | | | |
|---|---|---|---|
| 6,219,610 B1* | 4/2001 | Araki | 701/72 |
| 6,584,399 B2* | 6/2003 | Koibuchi | 701/90 |
| 6,931,313 B2* | 8/2005 | Kato et al. | 701/41 |
| 2002/0185913 A1* | 12/2002 | Watanabe | 303/139 |
| 2003/0120414 A1* | 6/2003 | Matsumoto et al. | 701/96 |
| 2004/0117099 A1* | 6/2004 | Inagaki et al. | 701/70 |
| 2005/0096826 A1* | 5/2005 | Iwasaka et al. | 701/70 |

FOREIGN PATENT DOCUMENTS

| | | |
|---|---|---|
| KR | 234834 | 12/1999 |
| KR | 1020000016785 | 3/2000 |

* cited by examiner

*Primary Examiner*—Chris Schwartz
(74) *Attorney, Agent, or Firm*—Morgan Lewis & Bockius LLP

(57) ABSTRACT

An apparatus for controlling vehicle stability includes a pressure calculator calculating a brake pressure. In one embodiment, the calculated brake pressure is calculated based on a yaw rate signal input from a yaw rate sensor. In other embodiments, the calculated brake pressure is further calculated on the basis of signals input from a steering angle sensor, a lateral acceleration sensor, a vehicle speeds sensor, and a master brake pressure sensor. A method for controlling vehicle stability is also provided. The method and apparatus enhances stability and reliability during vehicle driving.

10 Claims, 2 Drawing Sheets

APPARATUS AND METHOD FOR CONTROLLING VEHICLE STABILITY

CROSS-REFERENCE TO RELATED APPLICATION

This application claims priority to and the benefit of Korean Patent Application No. 10-2004-0107312 filed in the Korean Intellectual Property Office on Dec. 16, 2004, the entire contents of which are incorporated herein by reference.

BACKGROUND OF THE INVENTION (a) Field of the Invention

The present invention relates to an apparatus and a method for controlling vehicle stability. More particularly, the present invention relates to an apparatus and a method for controlling vehicle stability for stably controlling yaw behavior.

(b) Description of the Related Art

Generally, an apparatus for controlling vehicle stability includes a trace control system (TCS), an anti-lock brake system (ABS), and a vehicle dynamic system (VDS). An apparatus for controlling vehicle stability monitors a state of vehicle behavior on the basis of data measured from a yaw rate sensor detecting the vehicle behavior, a lateral acceleration sensor, wheel speed sensor, and steering angle sensor. The apparatus for controlling vehicle stability makes the vehicle stable by automatically controlling the vehicle behavior to meet a driver's intention. In a case that the state of the monitored vehicle behavior deviates from a target yaw rate determined by a steering angle and a vehicle speed, the apparatus for controlling vehicle stability generates a restituting yaw moment for maintaining stability. The restituting yaw moment is generally realized by differently controlling the left and right braking force. Since braking force is determined by a pressure of a caliper of a brake apparatus, a core aspect of controlling vehicle stability is controlling the brake pressure of respective wheels. Both, an open loop control method utilizing a table obtained by experiment or a closed loop method controlling the pressure after feedback of detecting the pressure of the caliper are known. Both methods, however, have shortcomings.

If the open loop control method is utilized, control performance may be poor, durability may be weak, and a brake pressure more excessive than a necessary pressure requested for controlling the vehicle may be supplied. If the closed loop control method is utilized, an additional pressure sensor should be mounted, costs increase, and in a case that the brake pressure sensor is out of order, the control system malfunctions.

SUMMARY OF THE INVENTION

The present invention provides an apparatus and a method for controlling vehicle stability having advantages of stably controlling a yaw moment.

An exemplary apparatus for controlling vehicle stability according to an embodiment of the present invention includes a yaw rate sensor detecting a yaw moment and outputting a corresponding yaw rate signal, a pressure calculator calculating a brake pressure for controlling respective wheels on the basis of a yaw rate signal input from the yaw rate sensor and signals input from a steering angle sensor, a lateral acceleration sensor, a vehicle speed sensor, and a master brake pressure sensor, an adder adding a target brake pressure and the calculated brake pressure, a pressure controller outputting a pulse width modulation (PWM) signal for controlling a brake pressure supplied to the respective wheels by analyzing a pressure value calculated by the adder and information of a steering angle, a lateral acceleration, and a vehicle speed, and an oil pressure controller controlling the brake pressure by calculating an actual brake pressure on the basis of the PWM signal transmitted from the pressure controller by utilizing a predetermined non-linear map, a linear model, and a disturbance compensating map. In one embodiment, the disturbance compensating map includes data for compensating for an error in the PWM signal of the brake pressure due to a change of a brake oil temperature.

An exemplary method for controlling vehicle stability according to an embodiment of the present invention includes detecting a yaw rate, calculating a brake pressure on the basis of the detected yaw rate, a steering angle, a lateral acceleration, a vehicle speed, and a master brake pressure, calculating a difference between the calculated brake pressure and a target brake pressure, outputting a PWM signal for controlling the operating brake pressure of respective wheels on the basis of the difference, a steering angle, a lateral acceleration, and a vehicle speed, and controlling the brake pressure of the respective wheels by calculating an actual brake pressure on the basis of the PWM signal by utilizing a predetermined non-linear map, a linear model, and a disturbance compensating map and by compensating for oil characteristics corresponding to an oil temperature change.

DETAILED DESCRIPTION OF THE EMBODIMENTS

Exemplary embodiments of the present invention will hereinafter be described in detail with reference to the accompanying drawings.

Figure 1:
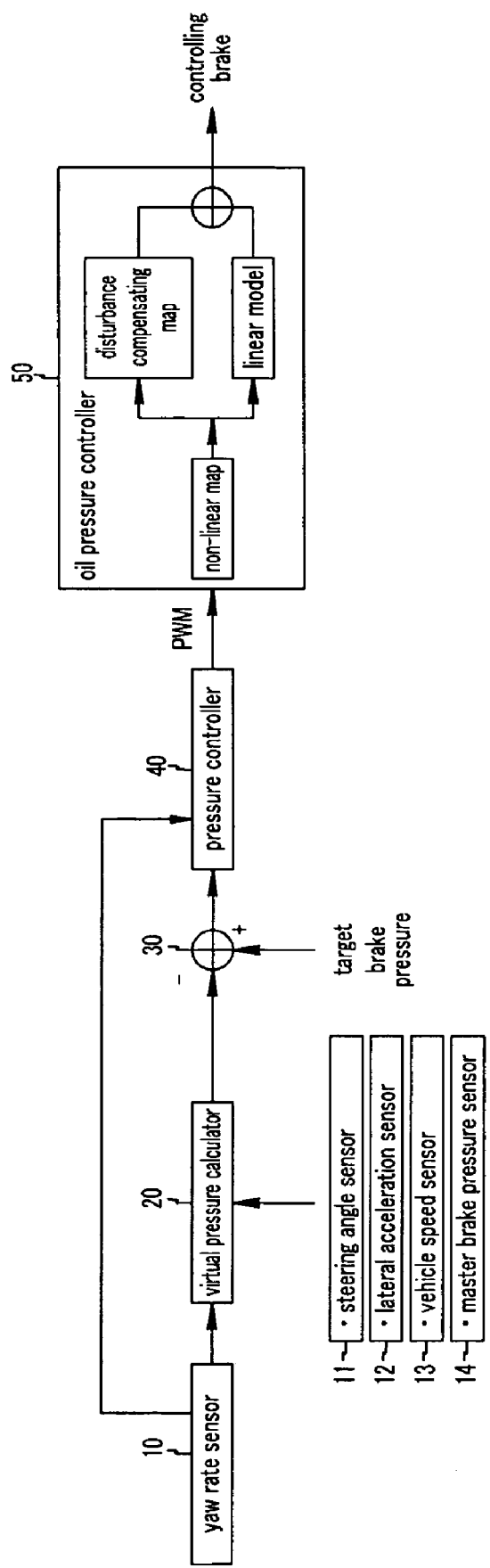
FIG. 1 is a block diagram showing an apparatus for controlling vehicle stability according to an exemplary embodiment of the present invention.
Figure 2:
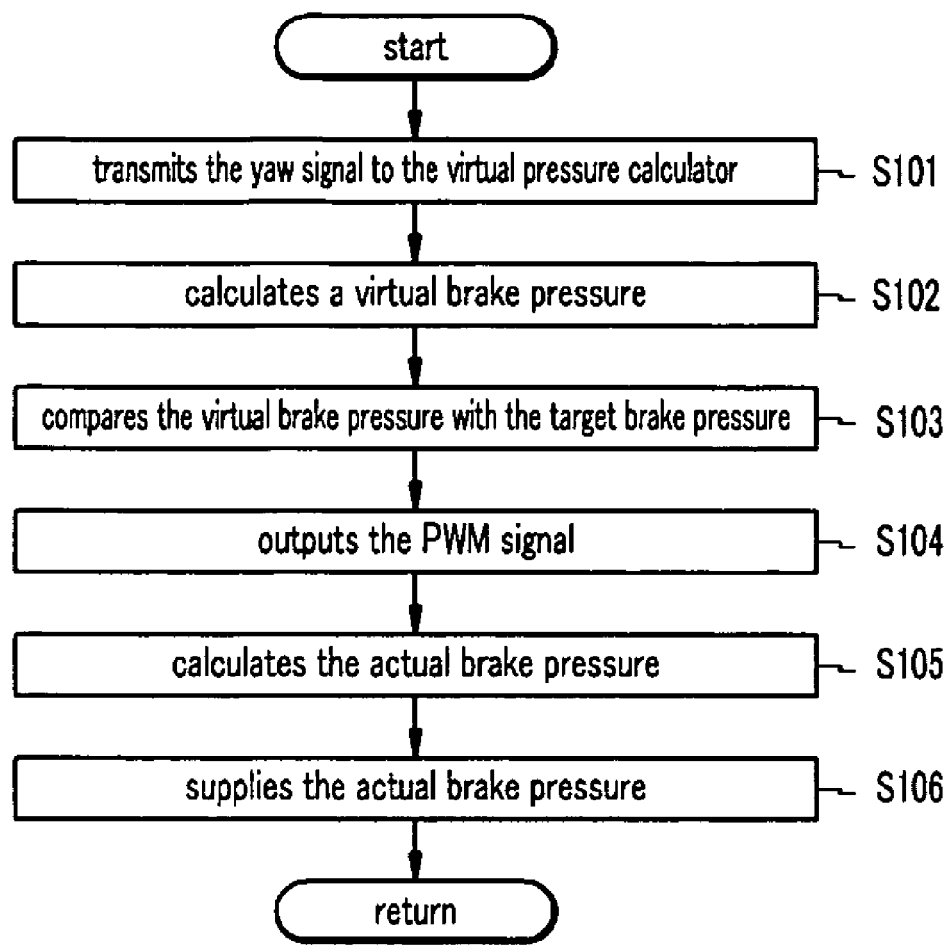
FIG. 2 is a flowchart showing a method for controlling vehicle stability according to an exemplary embodiment of the present invention.

As shown in FIG. 1, an exemplary embodiment of an apparatus for controlling vehicle stability of the present invention includes a yaw rate sensor 10, a pressure calculator 20, an adder 30, a pressure controller 40, and an oil pressure controller 50. The yaw rate sensor 10 detects a yaw moment occurring during driving a vehicle and outputs a corresponding yaw rate signal. The yaw moment occurs when the vehicle is driving, especially when the vehicle is traversing a curve.

The pressure calculator 20 calculates a brake pressure for controlling respective wheels on the basis of a yaw rate signal input from the yaw rate sensor 10 and signals input from a steering angle sensor 11, a lateral acceleration sensor 12, a vehicle speed sensor 13, and a master brake pressure sensor 14.

A master brake pressure is a combined total pressure of respective pressures for controlling respective wheels. Since the calculated brake pressure is not an actual brake pressure but a calculated value, the calculated brake pressure can be obtained even if a pressure sensor for detecting a brake pressure supplied to the respective wheels has an error.

Because the yaw rate sensor 10, the steering angle sensor 11, the lateral acceleration sensor 12, the vehicle speed sensor 13, and the master brake pressure sensor 14 are known to a person of ordinary skill in the art, the detailed description thereof is omitted herein.

The adder 30 adds a target brake pressure and the calculated brake pressure. The target brake pressure is a brake pressure for controlling a vehicle body motion, and because target brake pressure is known to a person of ordinary skill in the art, a detailed description thereof is omitted herein. The adder 30 adds the two pressure values by making the target brake pressure a plus value, and the calculated brake pressure a minus value. And then, the adder 30 outputs a result value. The pressure controller 40 outputs a pulse width modulation (PWM) signal for controlling a brake pressure supplied to the respective wheels by analyzing a pressure value calculated by the adder 30 and information of a steering angle, a lateral acceleration, and a vehicle speed. The oil pressure controller 50 controls the brake pressure by calculating an actual brake pressure on the basis of the PWM signal transmitted from the pressure controller 40 by utilizing a predetermined non-linear map, a linear model, and a disturbance compensating map. The linear model means a mathematical model of differential equation type. The oil pressure controller 50 controls a pressure of calipers of the brake apparatus by calculating the actual brake pressure of the respective wheels.

The non-linear map relates to a brake pressure and the brake pressure value is formed non-linearly, and a disturbance means an error due to temperature of a brake oil. In addition, the non-linear map and the disturbance compensating map are obtained by experiments and the disturbance compensating map includes data for compensating for the error in the PWM signal of the brake pressure due to a change of a brake temperature.

A method for controlling a vehicle stability of an exemplary embodiment of the present invention will hereinafter be described in detail with reference to the accompanying drawings.

If the vehicle is driving, the yaw rate sensor 10 detects a yaw moment, and transmits a yaw rate signal to the pressure calculator 20 at step S101.

And then, the pressure calculator 20 calculates a calculated brake pressure of the respective wheels in response to the yaw raw rate signal, steering angle, lateral acceleration, vehicle speed, and master brake pressure and transmits the calculated brake pressure to the adder 30 at step S102.

The adder 30 compares the calculated brake pressure with the target brake pressure and outputs a difference between the calculated brake pressure and the target brake pressure to the pressure controller 40 at step S103. The adder 30 adds the two pressure values by making the target brake pressure a plus value, and the calculated brake pressure a minus value.

And then, the pressure controller 40 outputs the PWM signal for controlling the brake pressure of the respective wheels on the basis of a value transmitted from the adder 30, the steering angle, the lateral acceleration, and the vehicle speed and transmits the PWM signal to the oil pressure controller 50 at step S104.

The oil pressure controller 50 controls the operating brake pressure of the respective wheels by calculating a required actual brake pressure on the basis of the PWM signal by utilizing a predetermined non-linear map, a linear model, and a disturbance compensating map and by compensating for oil characteristics corresponding to an oil temperature change. Therefore, the oil pressure controller 50 calculates the actual brake pressure of the respective wheels on the basis of the PWM signal having a non-linear dynamic characteristic with respect to the respective wheels at step S105, and supplies the actual brake pressure to the calipers of the respective wheels at step S106 to adjust the calipers and regulate stopping pressures in response to control signals applied from the oil pressure controller 50. Accordingly, behavior errors of the vehicle body appearing as a yaw moment, i.e., a spin, over steer, under steer, and trace, are stably controlled. Therefore, stability and reliability during vehicle driving are enhanced. Moreover, the apparatus for controlling vehicle stability according to an exemplary embodiment of the present invention supplies driving safety by supplying stability and reliability of motion control of the vehicle.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for controlling vehicle stability comprising:
    a yaw rate sensor detecting a yaw rate and outputting a corresponding yaw rate signal;
    a pressure calculator calculating a calculated brake pressure for controlling respective wheels on the basis of a yaw rate signal input from the yaw rate sensor and signals input from a steering angle sensor, a lateral acceleration sensor, a vehicle speed sensor, and a master brake pressure sensor;
    an adder adding a target brake pressure and the calculated brake pressure;
    a pressure controller outputting a PWM signal for controlling a brake pressure supplied to the respective wheels by analyzing a pressure value calculated by the adder and information of a steering angle, a lateral acceleration, and a vehicle speed; and
    an oil pressure controller controlling the brake pressure by calculating an actual brake pressure on the basis of the PWM signal transmitted from the pressure controller by utilizing a predetermined non-linear map, a linear model, and a disturbance compensating map.

2. The apparatus of claim 1, wherein the disturbance compensating map includes data for compensating for an error in the PWM signal of the brake pressure due to a change of a brake oil temperature.

3. The apparatus of claim 1, wherein the yaw rate sensor detects a yaw moment occurring during driving the vehicle.

4. The apparatus of claim 1, wherein the adder adds the two pressures by making the target brake pressure a plus value, and the calculated brake pressure a minus value.

5. The apparatus of claim 1, wherein the linear model is a mathematical model of differential equation type.

6. The apparatus of claim 1, further comprising the oil pressure controller controlling a pressure of a brake caliper.

7. A method for controlling vehicle stability comprising:
    detecting a yaw rate;
    calculating a calculated brake pressure on the basis of the detected yaw rate, a steering angle, a lateral acceleration, a vehicle speed, and a master brake pressure;
    calculating a difference between the calculated brake pressure and a target brake pressure;

outputting a PWM signal for controlling an operating brake pressure of respective wheels of the vehicle on the basis of the difference, a steering angle, a lateral acceleration, and a vehicle speed; and controlling the operating brake pressure of the respective wheels of the vehicle by calculating an actual brake pressure for the respective wheels on the basis of the PWM signal by utilizing a predetermined non-linear map, a linear model, and a disturbance compensating map and by compensating for oil characteristics corresponding to an oil temperature change.

8. The method of claim 7, further comprising supplying the actual brake pressure for the respective wheels to brake calipers of the wheels.

9. The method of claim 8, further comprising regulating a stopping pressure for the respective wheels via the calipers of each respective wheel.

10. The method of claim 7, wherein the yaw rate signal corresponds to a detected yaw moment.

\* \* \* \* \*